Dec. 3, 1940.  T. R. HARRISON  2,223,666
CONTROL METHOD AND APPARATUS
Filed Jan. 9, 1937  8 Sheets-Sheet 1
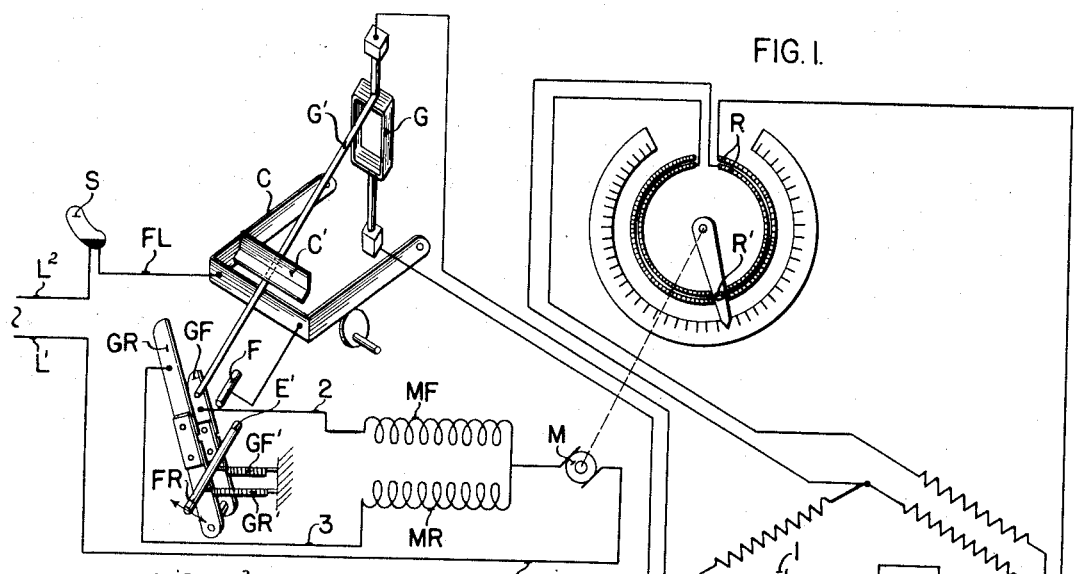
FIG. I.
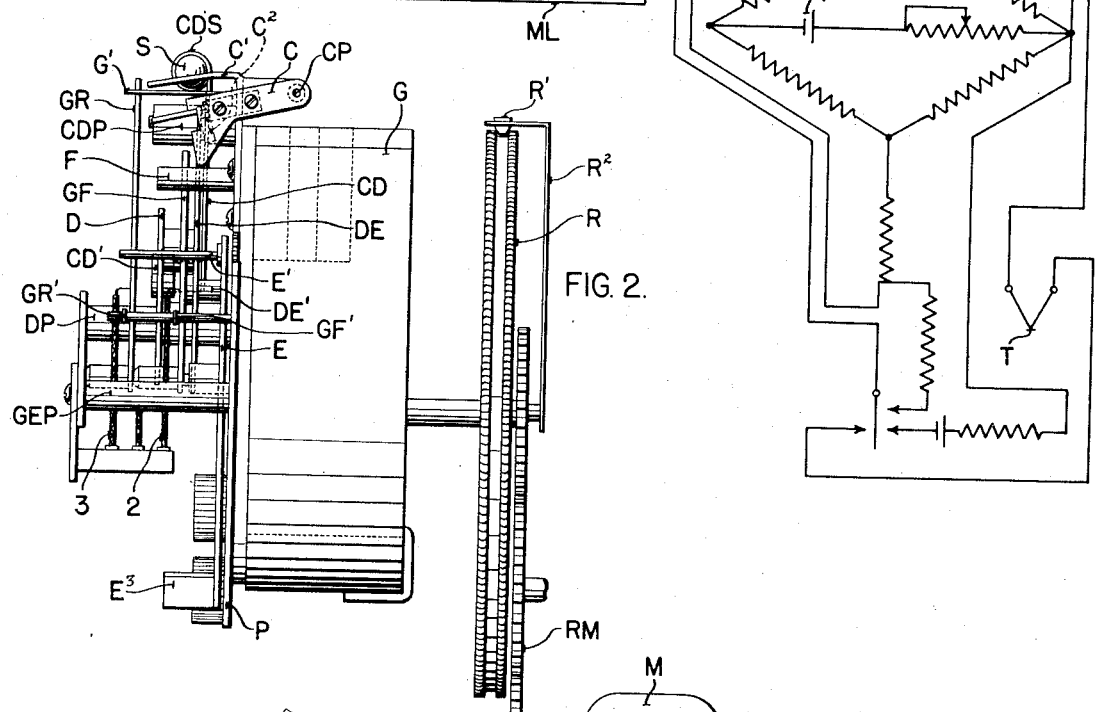
FIG. 2.
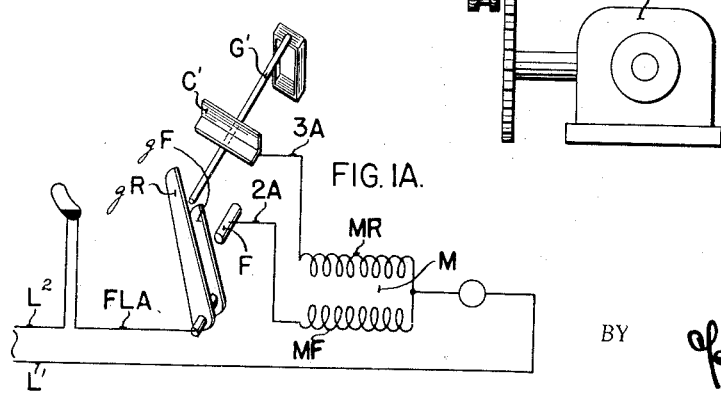
FIG. IA.
INVENTOR.
THOMAS R. HARRISON
BY George M. Meuschaim
ATTORNEY.

Dec. 3, 1940.　　　T. R. HARRISON　　　2,223,666
CONTROL METHOD AND APPARATUS
Filed Jan. 9, 1937　　　8 Sheets-Sheet 2

INVENTOR.
THOMAS R. HARRISON
BY
ATTORNEY

INVENTOR.
THOMAS R. HARRISON
BY George M. Wunchamp
ATTORNEY

Dec. 3, 1940. T. R. HARRISON 2,223,666
CONTROL METHOD AND APPARATUS
Filed Jan. 9, 1937 8 Sheets-Sheet 4

INVENTOR.
THOMAS R. HARRISON
BY George M. Muschamp
ATTORNEY

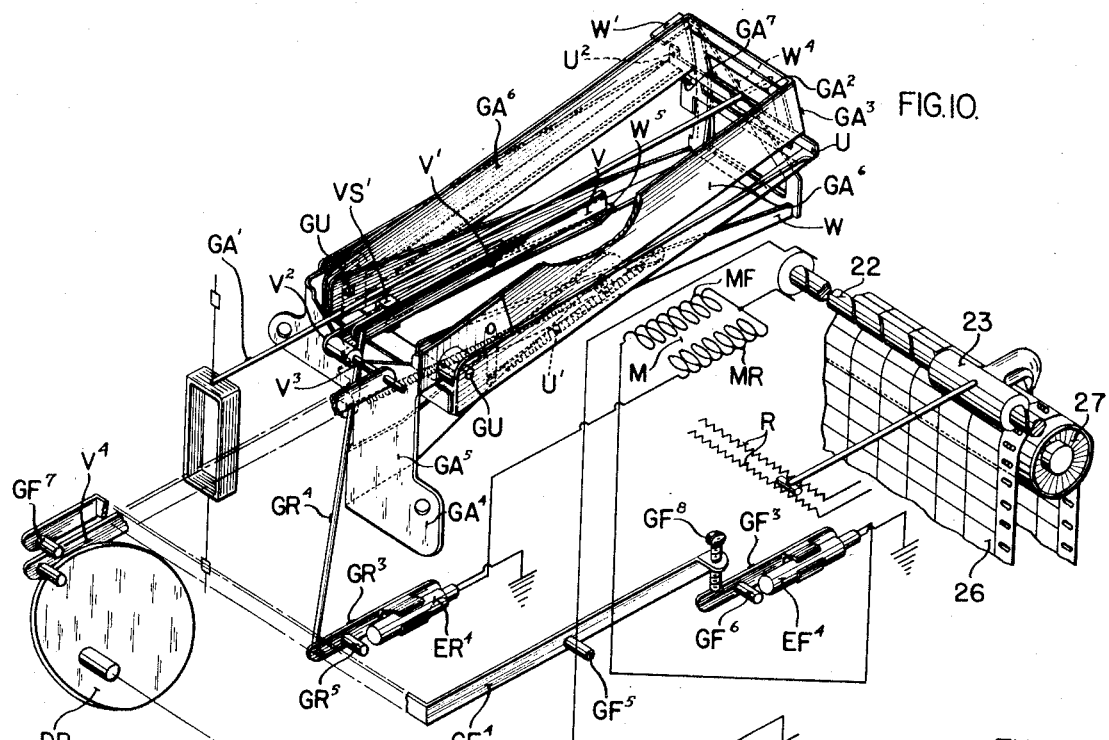

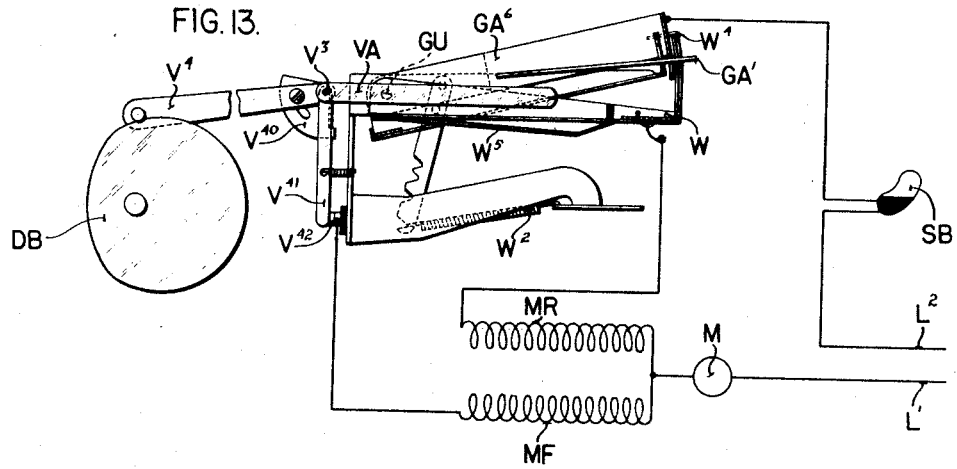
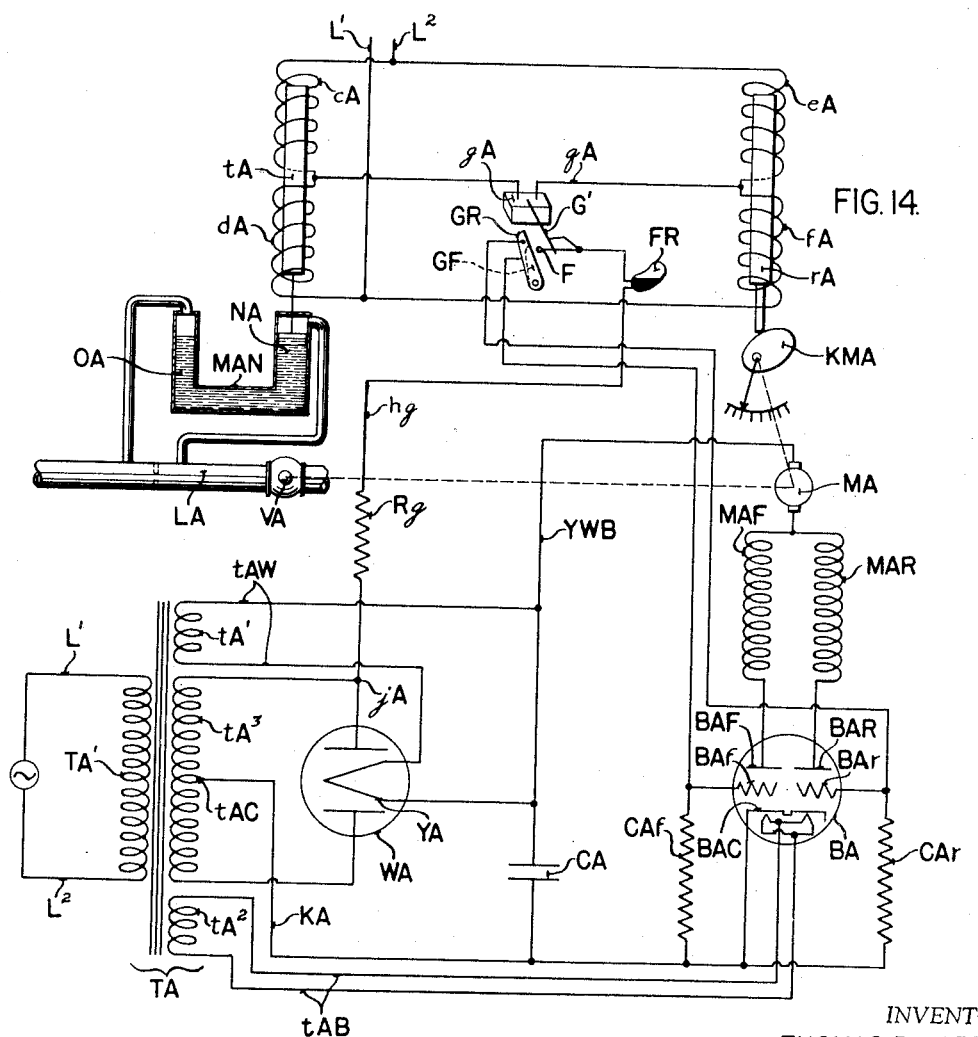

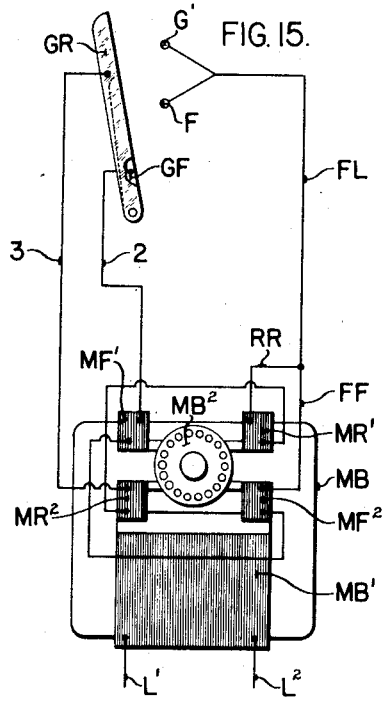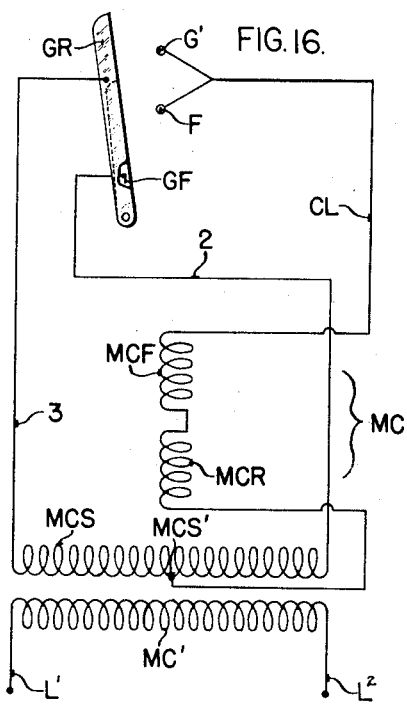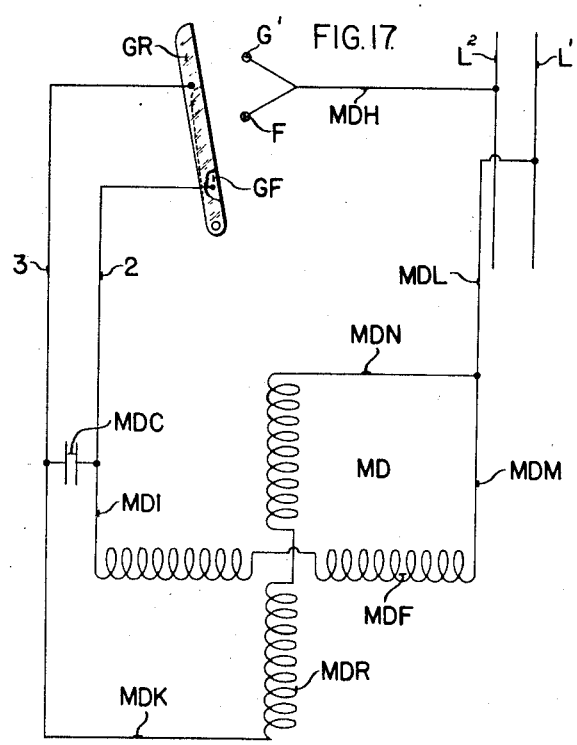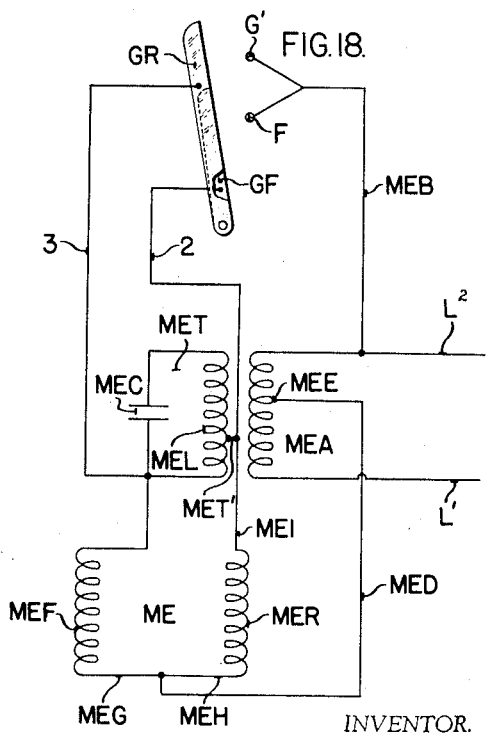

INVENTOR.
THOMAS R. HARRISON

Patented Dec. 3, 1940

2,223,666

UNITED STATES PATENT OFFICE 2,223,666

CONTROL METHOD AND APPARATUS

Thomas R. Harrison, Wyncote, Pa., assignor to The Brown Instrument Company, Philadelphia, Pa., a corporation of Pennsylvania Application January 9, 1937, Serial No. 119,761

26 Claims. (Cl. 172—239)

The general object of the present invention is to provide an improved method of and an improved apparatus for producing control effects in accordance with the variations in a variable condition, such as a variable temperature, rate of flow or pressure. The present invention may be employed with advantage in producing control effects for such purposes as the power, or relay, adjustment of the indicating pointer or recording pen of a measuring instrument in accordance with the deflection of a sensitive measuring unit, the control of a fuel valve or switch, the actuation of distant reading instruments, remote control operations, and for many other purposes in which a power actuated device or relay is operated in accordance with changes in the value of a variable condition.

In accordance with the present invention, I create control effects which are of fixed predetermined magnitude and create opposing control effects, each equal to, less than, or greater than a corresponding one of the first mentioned effects, accordingly as the variable condition is equal to, or differs in one direction or the other from a corresponding one of the first mentioned effects. The invention is of especial utility in controlling a reversible electric relay motor of a known type which is adapted to operate in one direction or the other or to stall, accordingly as one or the other of two opposing energizing actions impressed on the motor, predominates or are equal to one another. The use of such motors for control purposes avoids the motor over-running or coasting, experienced when the energization of motors of more usual type is interrupted.

The use of such a motor controlled in accordance with the present invention is especially advantageous for example, when used in a self-balancing potentiometer instrument to adjust the slide wire resistance and pen carriage of the instrument, in accordance with the deflection of the galvanometer connected to the potentiometer circuit. In such potentiometric uses of the invention, the galvanometer actuating current is ordinarily minute, and the galvanometer deflection impulse correspondingly small, and the galvanometer actuating current or a minute controlling current regulated by the galvanometer, may advantageously be amplified for the purposes of the present invention by the use of electronic amplifying means.

Specific objects and advantages of the invention are made apparent in the following descriptive matter and by the accompanying drawings in which I have described and illustrated various method and apparatus embodiments of the invention.

Of the drawings:

Fig. 1 is a more or less diagrammatical view illustrating the operation of one form of the invention;

Fig. 1A is a modification of Fig. 1;

Fig. 2 is a side elevation of apparatus, a portion of which is shown in Fig. 1;

Fig. 10 is a diagrammatical view of another form of my invention;

Fig. 10A is a view of a portion of Fig. 10;

Fig. 11 is a side sectional view of a portion of Fig. 10;

Fig. 12 is a front view of Fig. 11;

Fig. 13 is a diagrammatical view of still another form of my invention;

Fig. 14 is another embodiment of this invention, and

Figs. 15-21 are diagrammatic views showing the combination of this invention with different types of motor circuits.

Figure 3:
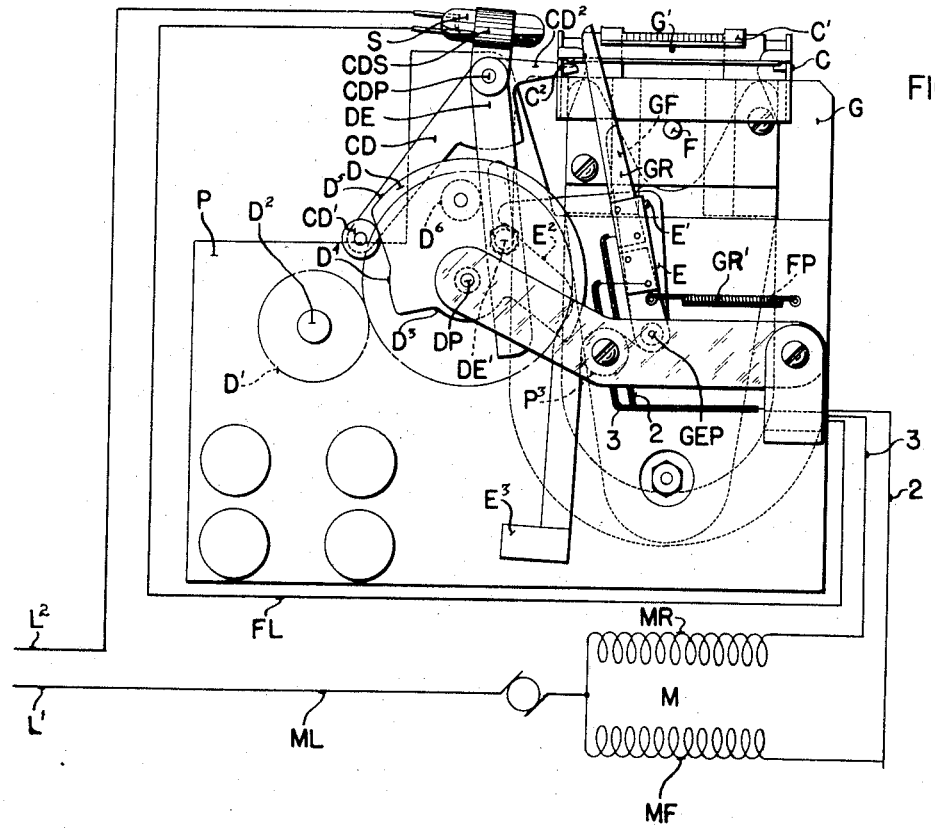
Figs. 3 and 4 are front elevations of the apparatus of Fig. 2 with the parts in different operative positions.

Referring first to Fig. 1, a galvanometer G having a pointer $G^1$ is adapted to respond to unbalance in a null point potentiometric circuit, the latter of which may be of any suitable type, such as the Brown potentiometer circuit disclosed in my prior Patent 1,898,124 issued February 21, 1933. Such circuits are well-known and it is sufficient for the present purposes to note that the potentiometer circuit includes a circuit branch including a source of variable potential to be measured such for example, as the thermocouple T, an opposing circuit branch including a source of known potential such as the cell I, and resistors R, a variable portion of the last of which may be connected into the opposed branches by means of a sliding contact $R^1$ whereby the respective effects of the variable and known sources are made equal and opposite, and the galvanometer is thus rendered undeflected when the circuit is balanced for a given value of the E. M. F. of the thermocouple T with contact $R^1$ in a corresponding position along the resistors R. The position of contact $R^1$ is then a measure of the value of the thermocouple E. M. F. and may then serve as a measure of the temperature to which it is exposed.

In the form of Fig. 1 my invention is concerned with the means by which the contact $R^1$ is adjusted back and forth along resistors R in response to galvanometer deflection, and as shown includes a motor M connected to contact $R^1$ for rotation of the latter when the motor is rotated, and galvanometer contacting means for selectively energizing the motor M in one direction or the other and for a period depending upon the direction and extent of galvanometer deflection.

The galvanometer contacting means includes a pair of arms GF and GR which are given oscillatory motion in regular cycles from an initial position into a final position during which movement, the arm GR is adapted to engage the pointer $G^1$ and the arm GF is adapted to engage a fixed stud F. The travel of arm GF is fixed and it moves in each cycle from its initial position to the position in which it contacts stud F but the travel of arm GR is variable and it moves from an initial position corresponding to the initial position of arm GF, to a position in which it contacts the galvanometer pointer. Arms GF and GR are urged by means of springs $GF^1$ and $GR^1$ in a direction to make contact respectively with members F and $G^1$ and are permitted to do so or prevented from doing so by an oscillating actuating pin $E^1$ which once in each cycle carries both arms in the counterclockwise direction to an initial position and permits the arms thereafter to turn clockwise toward engagement with members F and $G^1$.

The pointer $G^1$ which is made of electrically conducting material is periodically clamped by means of a clamp C against an abutment $C^1$ and the stud F and clamp C are electrically connected together and to one line $L^2$ of a source of electrical current by means of conductor FL and the instrument framework. Motor M shown in Fig. 1 as an ordinary series motor, is connected to the line L' on the opposite side of the supply source and is provided with two reversing fields MF and MR connected respectively by conductors 2 and 3 to arms GF and GR which are electrically insulated from each other, so that independent contact of arm GF with the stud F or contact of arm GR with pointer $G^1$ will result in energizing field MF or field MR rotating motor M in the forward or in the reverse direction.

In order to selectively energize motor M for rotation in one direction or the other depending upon the direction of deflection of pointer $G^1$ from its mid or null position and to make the extent of rotation of the motor proportional to the extent of deflection of the galvanometer, the fixed stud F is arranged to be contacted by arm GF at the mid point in the oscillatory travel of arms GF and GR at which point the galvanometer pointer $G^1$ will also be contacted, while clamped, by arm GR, if at that time the galvanometer is in its null position. Under such conditions both fields of motor M will be simultaneously energized and consequently no rotation of the motor will result. Subsequently rod $E^1$ will pick up both arms together, and the circuit may be arranged so that both fields of motor M are thereby simultaneously de-energized but preferably as hereinafter described, independent interruptor means are provided for de-energizing the motor.

If the galvanometer when clamped is deflected to the left as seen in Fig. 1, the counterclockwise movement of arms GF and GR will result in engagement of the latter with pointer $G^1$ before arm GF contacts stud F. Such independent engagement of arm GR with pointer $G^1$ will result in energization of field MR and consequent rotation of the motor M. The rotation of motor M will continue until the arm GF contacts stud F thereby energizing field MF and stalling the motor. If the galvanometer when clamped is deflected to the right the counterclockwise rotation of arms GF and GR will first bring the arm GF into contact with the stud F thereby energizing field MF to rotate motor M in the forward direction which will be terminated by engagement of arm GR with the pointer $G^1$, whereby field MR is energized and the motor stalled. As will be clear, the rotation of motor M will move contact $R^1$ in a direction to restore the galvanometer pointer $G^1$ to its null position.

It will be noted that in view of the cyclic character of the operation, the period of energization of motor M in one direction or the other may be, and as shown is, made proportional to the extent of deflection of pointer $G^1$. The device may be utilized as thus far described to provide two energizing periods for motor M each proportional to the extent of deflection. Thus the element $E^1$ in turning counterclockwise during a left-hand deflection of pointer $G^1$ will pick up arm GF thereby de-energizing field MF and permitting the motor field MR to rotate the motor until element $E^1$ eventually picks up arm GR opening the circuit to field MR. Similarly on a right-hand deflection element $E^1$ will first pick up arm GR de-energizing field MR and permitting field MF to drive the motor again until the latter field is opened when arm GF is picked up by element $E^1$. In practice, however, it is desirable that motor M should be stopped by dynamic means rather than by merely de-energizing the motor. Ordinarily in a motor control system which depends upon merely opening a field for bringing the motor to rest, the motor will coast or overrun thereby setting up a "hunting" condition. It is also desirable to prevent circuit opening function by the arms GF and GR to prevent arcing. To these ends I provide an interruptor switch S whereby the circuit for motor M is opened at the end of the first half of the cycle before either arm GF or GR is picked up by element $E^1$, and remains open during substantially the entire counterclockwise movement of element $E^1$.

Figure 4:
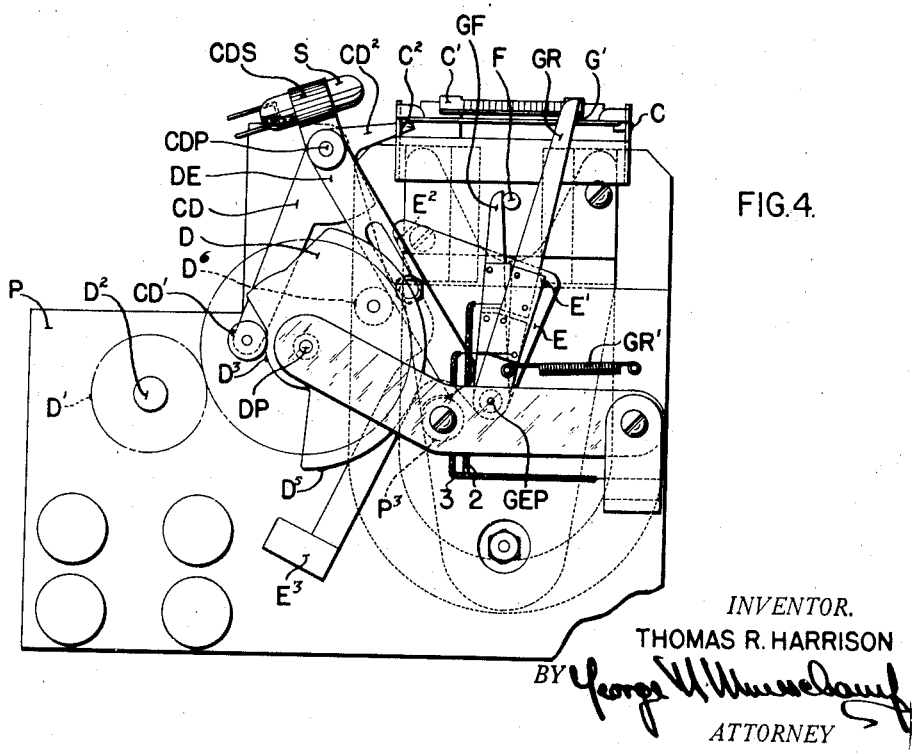

The mechanism shown for producing the oscillatory motion of arms GF and GR, and the relation of galvanometer G and associated parts will be clear from Figs. 2-4 in which a mounting plate P serves to support the various elements and to establish electrical connection of conductor FL to the galvanometer pointer $G^1$, when clamped against abutment $C^1$, and to stud F. A cam D journalled at DP in the plate P is continuously rotated through gearing $D^1$ by a shaft $D^2$, the latter of which is driven by a motor not shown. The cam D is provided with an edge configured to provide edge segments $D^3$, $D^4$, and $D^5$ and is rotated counterclockwise. A roller $CD^1$ carried by lever CD pivoted at CDP, cooperates with cam D whereby arm $CD^2$ of lever CD moves counterclockwise about CDP into the position of Fig. 4, under the gravitational bias of roller $CD^1$ and the longer arm of lever CD, when permitted to do so by cam D. Arm $CD^2$ is adapted to project into a slot $C^2$ of the clamp C which is pivoted at CP so that the clamp is brought into engagement with pointer $G^1$ and clamps the latter against abutment $C^1$ when lever CD turns counterclockwise at the time that edge segment $D^5$ leaves the province of roller $CD^1$ and the latter is engaged by edge segment $D^3$.

The lever CD carries a switch bracket CDS for the mercury switch S and when the lever CD is turned counterclockwise to the position of Fig. 4, switch S is tilted to its closed circuit position which position is maintained until the cam roller $CD^1$ leaves edge $D^3$ and is engaged by edge $D^4$ when the switch is tilted to an open circuit position. When roller $CD^1$ leaves edge $D^4$ and is engaged by edge $D^5$ the switch S is adjusted further in the clockwise or off direction and is so maintained until roller $CD^1$ is again engaged by edge $D^3$. The desirability of providing intermediate edge segment $D^4$ will later appear.

The operating means for the element $E^1$ whereby the oscillation of arms GR and GF is controlled includes a roller $D^6$ carried by cam D, which engages the edge of a lever DE the latter of which is loosely pivoted at CDP and carries a pin $DE^1$ adapted to engage the cam surface $E^2$ of a lever E. Lever E is loosely pivoted at GEP which is also the pivot for levers GF and GR and carries the previously mentioned element $E^1$. As shown in Fig. 3, the lever E is given a counterclockwise bias by means of counterweight $E^3$ which is sufficient to overcome the force of springs $GR^1$ and $GF^1$ so that edge $E^2$ exerts a force on pin $DE^1$ tending to turn lever DE into engagement with roller $D^6$. Movement of lever E counterclockwise is limited by its engagement with stationary stud $P^3$. When roller $D^6$ has rotated about 180° from the position of Fig. 3 it will re-engage the lever DE thereby turning lever E clockwise and permitting arms GR and GF to move clockwise into engagement with the pointer $G^1$ and pin F, respectively.

The furthermost positions of arms GR and GF in the clockwise direction are shown in Fig. 4 and it will be noted that the roller $D^6$ is then in its dead center or tangential position with respect to the edge of lever DE and roller $CD^1$ is about to leave edge segment $D^3$ and will shortly thereafter be engaged by edge $D^4$ before pin $DE^1$ has permitted any appreciable movement of arms GR and GF to the left. Switch S will thereby be moved to open position as the arms are restored to the starting position of Fig. 3. Thus the switch S opens the motor energizing circuit preventing operation of the latter during the movement of the arms GR and GF to the left and also obviates any circuit opening function at the pointer or at the stud F which might result in objectionable arcing. Conceivably, the dwell $D^4$ might be dispensed with but when provided insures positive tilting of switch S to its off position before the arms GR and GF leave the pointer $G^1$ and stud F, respectively, and further that the arms GR and GF are returned to their furthermost position in the counterclockwise direction before the clamp C releases the pointer $G^1$.

The galvanometer zero is set at the mid point of the abutment $C^1$ which may be graduated with divisional markings to indicate the galvanometer position, and the edge of stud F which is contacted by arm GF is disposed directly under the edge of the pointer contacted by arm GR whereby simultaneous engagement of the arms with their respective contacting element may be effected when the galvanometer is in zero position. The pin $DE^1$ as shown is adjustable radially of the axis of pivot CDP to govern the travel of arms GF and GR. Switch S is preferably arranged for angular adjustment about pivot CDP as for example, by frictional engagement between lever CD and bracket CDS permitting manual relative movement of those parts but insuring that the bracket CDS normally moves with the lever CD.

The potentiometer rebalancing means, as shown in Fig. 2, include the contact $R^1$ disposed on the end of a radial arm $R^2$, the latter being driven through suitable gearing RM by the motor M so that as the galvanometer pointer is deflected in one direction or the other and subsequently the arms GR and GF make engagement with their respective contacting elements, the motor M is energized for rotation in one direction or the other for a period depending upon the direction and extent of galvanometer deflection and moves the contact $R^1$ to a new position along the slide wire resistances R to produce an effect in the potentiometric circuit equal and opposite to that which gave rise to the galvanometer deflection.

As will be clear from Fig. 1A, the fields MR and MF may be connected, respectively, to the pointer $G^1$ and stud F through conductors 3A and 2A instead of to arms $gF$ and $gR$ corresponding to arms GF and GR of Fig. 1, and the latter may be connected together through their common pivot and to the line $L^2$ by conductor FLA. The connection to pointer $G^1$ may be made through abutment $C^1$ and clamp C. When so arranged, stud F, abutment $C^1$ and clamp C are insulated from the instrument framework and the operation of the device of Fig. 1A is substantially identical to the operation of the device of Fig. 1.

Figure 5:
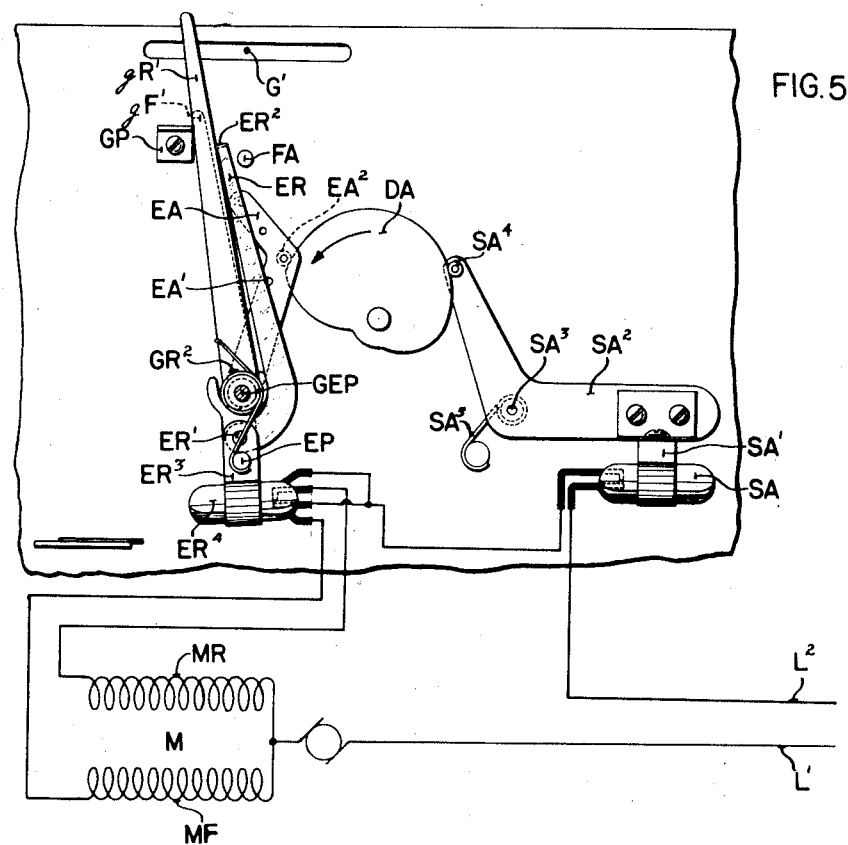
Figs. 5 and 6 are front elevations of a modification of the apparatus of Figs. 1-4 showing different operative positions of the device.
Figure 6:
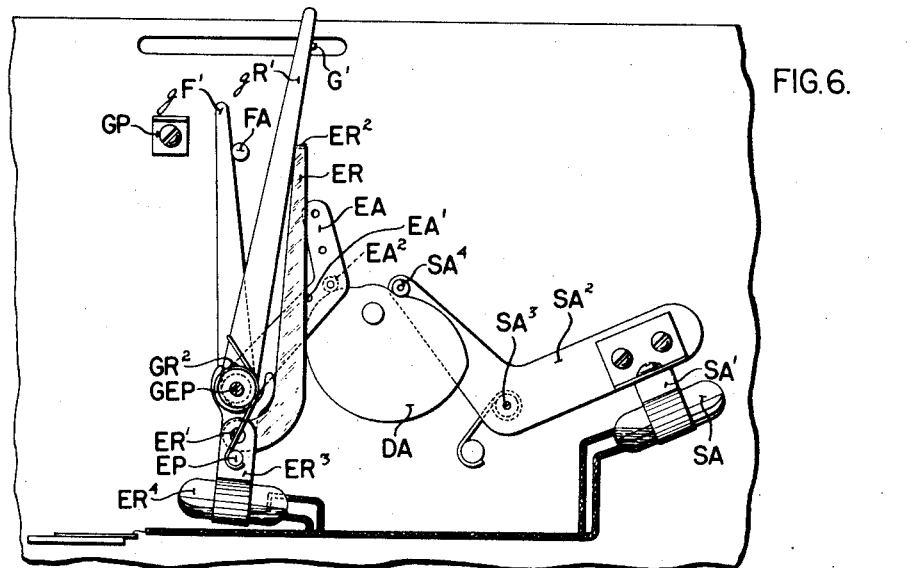
Figure 7:
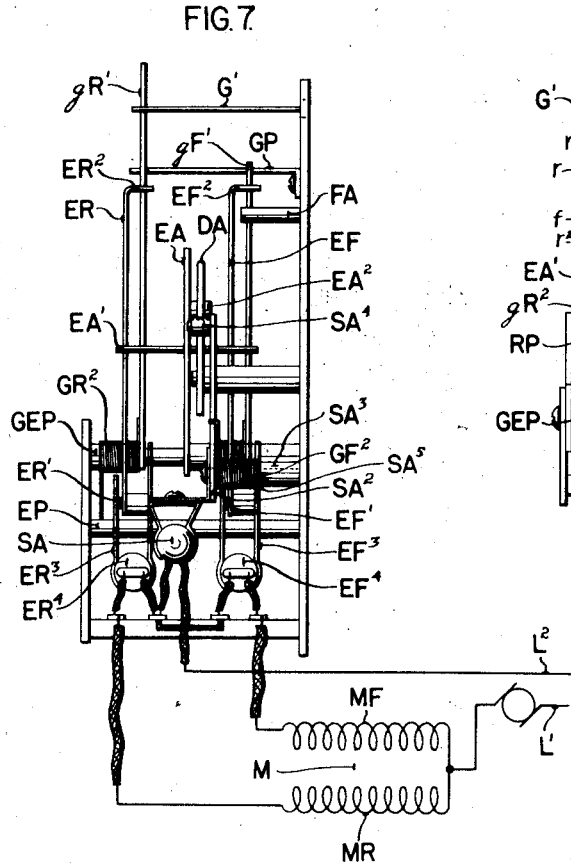
Fig. 7 is a side elevation of the device of Figs. 5 and 6.

The modification shown in Figs. 5–7 permits the use of enclosed switches in lieu of the open contact arrangement of Figs. 1–4, but functionally is like the device of those figures. In Figs. 5–7, a cam DA continuously rotated counterclockwise cooperates with a roller $EA^2$ of a lever EA pivoted at GEP to oscillate said lever and thereby cause engagement of a rod element $EA^1$ carried by lever EA with a pair of levers EF and ER. The levers EF and ER are journalled on floating pivots $EF^1$ and $ER^1$ and carry at their upper ends respectively projections $EF^2$ and $ER^2$ adapted to engage the contact arms $gF^1$ and $gR^1$. Arms $gF^1$ and $gR^1$ are urged in the clockwise direction by springs $GF^2$ and $GR^2$. Pivots $EF^1$ and $ER^1$ are carried respectively by brackets $EF^3$ and $ER^3$ loosely pivoted on the fixed shaft EP and single pole mercury switches $EF^4$ and $ER^4$ are carried respectively by brackets $EF^3$ and $ER^3$. The upper ends of brackets $EF^3$ and $ER^3$ are bifurcated and loosely surround the shaft GEP whereby limited rotation of the brackets about shaft EP is permitted. The brackets $EF^3$ and $ER^3$ are urged clockwise about EP into engagement with the left-hand edge of shaft GEP (see Fig. 6) by gravitational bias and in this position switches $EF^4$ and $ER^4$ are in their closed circuit positions.

Upon rotation of cam DA, the element $EA^1$ in its counterclockwise movement engages levers EF and ER and carries the latter into respective engagement with arms $gF^1$ and $gR^1$ as shown in Fig. 6 and the levers are thereafter turned clockwise about their points of engagement with arms $gF^1$ and $gR^1$, moving floating pivots $EF^1$ and $ER^1$ to the left and tilting brackets $EF^3$ and $ER^3$ counterclockwise into engagement with the right-hand edge of shaft $GEP$. The switches $EF^4$ and $ER^4$ will then be in their open circuit positions. The counterclockwise movement of arms $gR^1$ and $gF^1$ will be terminated by engagement with stop $GP$ and positive tilting of the brackets $EF^3$ and $ER^3$ counterclockwise is insured by virtue of the positive driving action of pin $EA^1$ moving arms $gR^1$ and $gF^1$ against the fixed stop $GP$ and against the clockwise bias of brackets $ER^3$ and $EF^3$. As the force of element $EA^1$ is subsequently removed from levers $EF$ and $ER$ shortly thereafter on a clockwise movement of lever $EA$, switches $EF^4$ and $ER^4$ will be maintained in their open circuit positions and arms $gF^1$ and $gR^1$ will be permitted to turn clockwise under the action of springs $GF^2$ and $GR^2$. In the actuation of switches $EF^4$ and $ER^4$ the gravitational bias of the latter, the gravitational and spring bias of arms $gR^1$ and $gF^1$ and the location of pin $EA^1$ are the chief factors and may be varied to properly proportion their effects.

A switch $SA$ corresponding to switch $S$ of Figs. 1–4 is carried by bracket $SA^1$ of the lever $SA^2$. Lever $SA^2$ is pivoted at $SA^3$ and carries roller $SA^4$ adapted to be engaged by cam $DA$ moving lever $SA^2$ clockwise against the bias of spring $SA^5$ once in each rotation of cam $DA$. The switch $SA$ is so arranged that as levers $gF^1$ and $gR^1$ start to move clockwise from the position of Fig. 5, it will be quickly tilted to its on position.

If the galvanometer pointer $G^1$, which may be arranged in a potentiometer circuit and periodically clamped as explained in connection with Figs. 1–4, is in its neutral position, it will be contacted by arm $gR^1$ when the latter has traversed approximately one half of its total range of travel and simultaneously the arm $gF^1$ will engage a fixed stud $FA$. Upon engagement and interruption of the travel of arms $gF^1$ and $gR^1$ the force tending to turn switch brackets $EF^3$ and $ER^3$ counterclockwise is removed and the switches will then simultaneously turn, under the action of gravity, into their circuit closing positions. The switches $EF^4$ and $ER^4$ are connected into a reversible motor circuit as shown which is practically identical to the circuit of Figs. 1–4. As the arms $gF^1$ and $gR^1$ are thus interrupted both fields of motor $M$ will be energized together and no rotation of the motor will result. The element $EA^1$ will subsequently continue to its furthermost clockwise position shown in Fig. 6 and upon its reversal and return movement, the switch $SA$ will be quickly opened in which position it will remain throughout the counterclockwise movement of the element $EA^1$.

If the galvanometer pointer $G^1$ is deflected to the right as shown in Fig. 6, the movement of arm $gF^1$ will be interrupted as just described by engagement with stud $FA$ thereby closing switch $EF^4$. Arm $gR^1$ will not be simultaneously interrupted, however, and field $MF$ will be energized to rotate motor $M$ in a direction to restore the potentiometer balance. The rotation of motor $M$ will be thereafter terminated by the engagement of arm $gR^1$ with the galvanometer pointer, tilting switch $ER^4$ and energizing field $MR$. On a deflection of pointer $G^1$ to the left, arm $gR^1$ will engage the pointer before arm $gF^1$ engages stud $FA$ resulting in the energization of field $MR$ and rotation of motor $M$ in the opposite direction until such rotation is terminated by the engagement of arm $gF^1$ with stud $FA$ at the mid point in the cycle.

Figure 8:
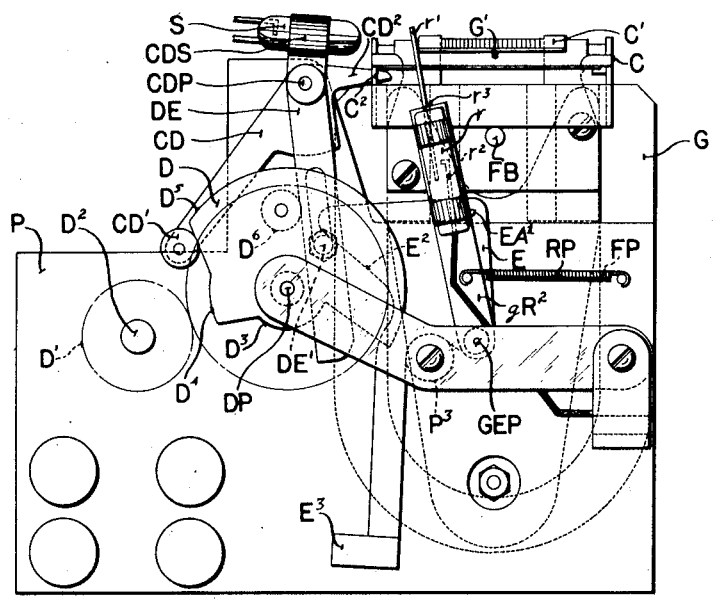
Fig. 8 is a front elevation of another modification of the device of Figs. 1-4.
Figure 9:
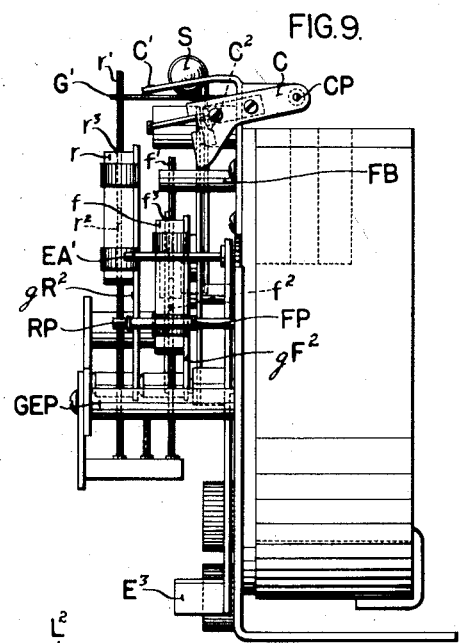
Fig. 9 is a side elevation of the device of Fig. 8.

In Figs. 8 and 9 is illustrated a modification of the invention employing enclosed dry switches in a mechanism similar to the mechanism of Figs. 1–4. The correspondingly identified parts of Figs. 1–4 and Figs 8 and 9 have the same functions. A pair of arms $gF^2$ and $gR^2$ pivoted at $GEP$ are provided each carrying a switch envelope $f$ or $r$ having contacts $f^1$, $f^2$ and $r^1$, respectively. Contacts $f^2$ and $r^2$ are substantially fixed in the lower ends of the respective envelopes $f$ and $r$ but may have a slight resilience, and are adapted to be engaged, respectively, by contacts $f^1$ and $r^1$, the latter of which are pivoted at $f^3$ and $r^3$. The pivotal mounting of contacts $f^1$ and $r^1$ in the upper end walls of the envelopes is made permissible by the formation of the end wall in the form of a flexible ceramic or metallic diaphragm as is well known. Contacts $f^1$ and $r^1$ are connected together and to line $L^2$ and contacts $f^2$ and $r^2$ are respectively connected to motor fields $MF$ and $MR$ of motor $M$.

Levers $gF^2$ and $gR^2$ are adapted to be oscillated by element $EA^1$ in much the same manner as the arms $GF$ and $GR$ of Figs. 1–4 are oscillated. Contact $r^1$ is adapted to engage pointer $G^1$ and contact $f^1$ is adapted to engage stud $FB$. When permitted to turn clockwise from the position of Fig. 8 under the action of springs $FP$ and $RP$, arms $gF^2$ and $gR^2$ will carry contacts $f^1$ and $r^1$ toward engagement with pointer $G^1$ and stud $FB$ respectively, and if at the time engagement occurs, the pointer $G^1$ is at neutral, both contacts $f^1$ and $r^1$ will be turned simultaneously in the counterclockwise direction about $f^3$ and $r^3$, respectively, closing both pairs of contacts and energizing both fields $MF$ and $MR$. Deflection of pointer $G^1$ to the left will result in earlier engagement of contact $r^1$ and energization of field $MR$ which will continue until contact $f^1$ is contacted at the mid point in the cycle. Deflection of the pointer to the right will result in later contact of pointer $G^1$ by contact $r^1$, and the prior engagement of contact $f^1$ with stud $FB$ will result in energization of field $MF$ and thereby rotation of the motor, which rotation will be terminated when contact $r^1$ finally contacts the pointer.

Figs. 10–13 disclose embodiments of my invention which are more readily adaptable to a strip chart type of recorder, as distinguished from a circular chart type of instrument for which the devices of Figs. 1–8 are more readily adapted as shown. It will be understood, of course, that all the devices illustrated herein may be adapted to either type of recorder and in fact, may be employed without any associated recording means. The device of Figs. 10–12 is similar to the device of Figs. 5–8 in respect to the provisions for the elimination of the necessity for completing the motor energizing circuits through the galvanometer pointer and instrument framework, and the device of Fig. 13 is similar to the device of Figs. 1–4 in that the motor is energized over circuits including the galvanometer pointer and instrument framework.

In Fig. 10 the galvanometer pointer $GA^1$ is adapted to oscillate in a slot $GA^2$ of a frame member $GA^3$, the latter of which includes a foot portion $GA^4$ fastened to the instrument framework, an upright $GA^5$ and a forwardly extending U-shaped member $GA^6$ rigidly connected to the portion $GA^5$ and in which the slot $GA^2$ is formed. The frame $GA^3$ carries pivots $GU$ upon which is journalled a clamping table $U$ normally urged into contact with the pointer $GA^1$ by means of a spring U¹, but is prevented from contacting the pointer during a portion of the cycle of operation through engagement of its projection U² by a projection W¹ of the contact table W. The table W is also pivoted at GU to the frame GA³ and is urged by means of spring W² into a position in which the sloping edge W⁴ engages the pointer GA¹ when the latter is clamped. The table W is held out of engagement with the pointer GA¹ by lever means including a floating lever V pivoted at V¹ to a second lever V², one end of the lever V being adapted to contact a portion W⁵ of the table W. Lever V² is fixed to the shaft V³ which is journalled in the instrument framework, and the shaft V³ is given oscillatory motion by means of another lever V⁴ fixed thereto which cooperates with the edge of cam DB. To the opposite end of the lever V is attached a link GR⁴, the other end of which is attached to an arm GR³ pivoted at GR⁵ and carrying mercury switch ER⁴. Due to the weight of the switch ER⁴, lever GR³ is given a clockwise bias which tends to turn the lever V clockwise about pivot V¹ toward engagement with the part W⁵ of the table W and into engagement with a stop VS¹ carried by lever V². The axis of the pivot point connecting link GR⁴ and lever V may be arranged to coincide with the axis of shaft V³, if desired, but the practically preferred arrangement shown in which those axes are displaced is satisfactory for the present purposes.

In the operation of the parts just described on a clockwise movement of the lever V⁴ and shaft V³ from the position of Fig. 10, the pivot V¹ will be moved downward thereby turning the lever V clockwise about the axis of its point of attachment to link GR⁴. Lever V will thereafter engage part W⁵ of the table W and further down movement of pivot V¹ will result in counterclockwise rotation of lever V about its point of engagement with part W⁵ of table W forcing link GR⁴ downward and tilting switch ER⁴ to its off position. This movement of lever V will be terminated by its engagement with a stop VS carried by lever V² and thereafter table W will be turned downward away from pointer GA¹. In the course of this movement of the table W, the projection W¹ will engage the projection U², moving clamping member U away from the pointer GA¹ to free the latter. The movement of table W and clamp U away from the pointer is terminated by engagement of projection W¹ with the projection GA⁷ of member GA⁶.

Subsequently, on counterclockwise movement of the lever V⁴ the force imparted to the lever V through the pivot V¹ will be removed permitting lever V to turn counterclockwise about its point of attachment to the link GR⁴ and table W to rise under the action of springs W² and U¹. As the table W begins to move toward the pointer GA¹, the force imparted by projection W¹ tending to hold the clamp U out of engagement with the pointer GA¹, is removed and the pointer is clamped in its then deflected position and further counterclockwise rotation of the pivot V¹ will result in engagement of the edge W⁴ of the table W with the pointer in its clamped position. When, during the rising movement of the table W the latter is intercepted by the galvanometer pointer GA¹, the continued rise of the pivot V¹ will rotate the lever V clockwise about its point of engagement with the projection W⁵. The downward force upon the link GR⁴ is thereby removed and the lever GR³ permitted to turn under its gravitational bias into a position in which the switch ER⁴ is closed. It should be noted in this connection that the gravitational bias of the lever GR³ is not sufficient to interfere with the movement of the table W into contact with the pointer GA¹ under the action of the spring W². As will be clear from the foregoing, switch ER⁴ is closed at a point in the cycle of operation dependent upon the position of pointer GA¹.

The switch ER⁴ and a time actuated switch EF⁴ serve the function of the correspondingly identified switches of Figs. 5–7 which are connected respectively to the motor fields MR and MF of the motor M. Another switch SB corresponding in function to the switches S and SA is inserted in the common line wire to motor M and may be of the same general form as switch S. Switch SB may be actuated to the on position only during the interval that table W approaches pointer GA¹ by cam means including cam DC corresponding in contour to the cam D of Fig. 3 and a cooperating lever DC¹ pivoted at DC² and carrying the switch SB.

The means for actuating switch EF⁴ in the device of Fig. 10 includes a lever GF⁴ pivoted to the instrument framework at GF⁵ which is adapted to engage a lever GF³ pivoted at GF⁶ and the lever GF³ carries the mercury switch EF⁴. Lever GF⁴ is provided with a projection GF⁷ adapted to ride on the lever V⁴. The connection between lever GF⁴ and lever GF³ is preferably made adjustable by means of a set screw GF⁸. The parts are so arranged and adjusted that when the lever V⁴ is in a position in its counterclockwise range of travel such that at that time the lever W would contact the galvanometer pointer if the latter were then in its neutral position, the switch EF⁴ will be turned to its on position and will remain in that position throughout the remaining counterclockwise movement of the lever V⁴ and the reverse clockwise movement of that lever until the corresponding point is reached in the reverse movement of lever V⁴.

In operation, if the pointer GA¹ were in its mid or neutral position when contacted by table W, the switches EF⁴ and ER⁴ would be simultaneously closed. If the galvanonometer pointer were then deflected to the right as seen in Fig. 10, the switch EF⁴ would be turned to its on position before the table W were brought into contact with the pointer GA¹ and in consequence the motor field MF would be energized to rotate motor M in one direction until the switch ER⁴ were tilted to its on position as a result of interception of the table W whereby field MR would be energized to stall the motor. On a deflection of the pointer GA¹ to the left, table W would be contacted before switch EF⁴ were turned to its on position and as a result switch ER⁴ would be tilted to energize field MR to rotate motor M in the reverse direction which rotation would be terminated by the subsequent tilting of switch EF⁴.

The apparatus of Fig. 10 may be arranged in a casing as shown in my prior Patent 1,946,280, issued February 6, 1934, with suitable recording means driven by motor M, diagrammatically illustrated in Fig. 10 as a chart 26 driven by a continuously rotating roller 27 and a cooperating pen carriage 23 driven back and forth by spiral shaft 22 as is well known, the shaft 22 being connected to motor M directly or through suitable gearing.

The modification of Fig. 13 includes the adaptation of open contacts as in Figs. 1–4 to the galvanometer clamping and gauging arrangement of Figs. 10–12 and the correspondingly numbered parts of Fig. 13 serve the same general functions as the parts similarly designated in Figs. 10–12. In Fig. 13, however, the switches EF$^4$, ER$^4$ are eliminated and the energizing circuits of the motor M are completed through contacting arms, galvanometer pointer and instrument frame. The continuously operated cam DB serves to oscillate the shaft V$^3$ through the lever V$^4$ as in the device of Figs. 10–12 but in the device of Fig. 13 the table W is directly oscillated by a lever VA fixed to shaft V$^3$. In Fig. 13 the lever V$^4$ is provided with an adjustable member V$^{40}$ adapted to engage and oscillate a contact member V$^{41}$ loosely pivoted on the shaft V$^3$ and spring urged into engagement with a fixed contact V$^{42}$. Contact V$^{42}$ is insulated from the instrument frame work and is connected to the field MF, and the parts are so related and disposed that contacts V$^{41}$ and V$^{42}$ will be closed at a point in the cycle of operation corresponding to the point in that cycle at which the galvanometer pointer will be engaged by the table W if the pointer is then in its neutral position. The contact member V$^{41}$ is electrically connected to the instrument framework and the latter is connected to the line L$^2$. The outer end of the table W is insulated from the instrument framework and is connected to the field MR of the motor M so that contact of the table W with the pointer GA$^1$ while clamped, will result in energization of the field MR, and closure of contacts V$^{41}$ and V$^{42}$ will result in energization of field MF.

Commencing the cycle with the table W in its receded or non-contacting position, the galvonometer will be clamped in its deflected position at the start of the counter-clockwise movement of the lever V$^4$ and at that time the switch SB will be moved to its closed position. With the pointer in its neutral position it will be seen that the fields MR and MF will be simultaneously energized as a result of the engagement of the table W with the pointer GA$^1$ and the closure of contacts V$^{41}$ and V$^{42}$ respectively. If the pointer is deflected to the left the table W will make contact therewith prior to the closure of the contacts V$^{41}$ and V$^{42}$, and in consequence the field MR will be energized to rotate motor M, which rotation will be terminated when the contacts V$^{41}$ and V$^{42}$ are closed. If the galvanometer pointer is deflected to the right the table W will not contact the pointer GA$^1$ until after the contacts V$^{41}$ and V$^{42}$ have been closed, with the result that field MF will be energized to effect rotation of motor M until contact of table W and pointer GA$^1$ is ultimately effected. Switch SB is diagrammatically shown in Fig. 13 and may be of the type shown in Fig. 10 for interrupting the circuit to the motor M during the portion of the cycle that the table W is moving away from the pointer GA$^1$.

In Fig. 14 is disclosed the application of my invention to the control of a reversible electrical motor through an amplifier. As shown my invention is adapted to flow measurement in a system including a manometer MAN having opposed legs OA, NA and partially filled with mercury and upon the respective legs of which are impressed pressures correspondingly varying with the up and down stream pressures respectively across an orifice inserted in the pipe line LA containing the flowing fluid to be measured. The level of the mercury in leg NA accordingly varies with the flow in pipe LA and I preferably measure the level variations by means including the inductance bridge system disclosed in my prior Patent 1,743,852 issued Jan. 14, 1930. The bridge system as shown includes a pair of end to end coils cA, dA in the transmitter connected to another pair of end to end coils eA, fA in the receiver to form a bridge circuit. An armature tA carried by a float resting on the mercury in leg NA is caused to move into and out of coils cA, dA thereby varying the inductance of those coils and unbalancing the bridge circuit. Bridge circuit unbalance may be detected by a galvanometer gA inserted in the equalizer leg qA which galvanometer may have a pointer G$^1$ corresponding to the pointer G$^1$ of Fig. 1.

In the arrangement shown I provide for bridge circuit rebalancing means corresponding broadly to the potentiometric means hereinbefore described and including an armature rA adapted to be moved into and out of the coils eA, fA by a motor operated cam KMA. The cam KMA is connected to motor MA corresponding generally to the motor M of Figs. 1–13 and is energized by means controlled by the galvanometer pointer over circuits to be described. The means controlled by the galvanometer pointer may be of the open contact form of Figs. 1–4 and 13, of the closed contact form of Figs. 8–9, of the mercury switch forms of Figs. 5–7, 10–12 or of other suitable form.

The circuit over which motor MA is energized includes a twin amplifier tube BA such as a "53" type tube for individually controlling the energization of fields MAF and MAR. This tube is a heater cathode type combining in one envelope two triodes and includes anodes or plates BAF and BAR, grids BAf and BAr, and filaments for heating a common cathode BAC.

Referring to Fig. 14 it may be seen that the necessary direct current voltages are obtained from a standard rectifier arrangement including a rectifier tube WA, a power supply transformer TA and a filter condenser CA. The rectifier WA may be any suitable full wave rectifier, such as an "80" type tube, adapted for use in direct current power supply devices which operate from an alternating current supply line. The transformer TA, as shown, includes a primary winding TA$^1$ connected to a suitable alternating current energizing source, and wound on a common core with secondary windings tA$^1$, tA$^2$ and tA$^3$. The windings tA$^1$ and tA$^2$ are filament heater windings and supply, through conductors tAW and tAB, filament current to tubes WA and BA, respectively. Connection is made by a conductor KA to the cathode BAC from a center tap tAC on the winding tA$^3$ whose terminals are connected to the plates of the rectifier tube WA, the electronic circuit being completed through the tube BA to opposing motor field windings MAF and MAR, the motor armature MA, conductor YWB to the rectifier tube filament YA, and through the rectifier tube WA back to the winding tA$^3$.

A direct current charge is maintained across the filter condenser CA due to the rectification of the alternating voltage across both halves of the winding tA$^3$. Because of the rectifying action of tube WA, current flows through the conductor KA in one direction only thereby setting up the direct current charge across the condenser CA. By assigning suitable values to the various elements of the rectifier circuit a difference of potential suitable for supplying operating voltage to the tube BA may be obtained.

The characteristics of the tube BA are such that with the grids at zero potential with respect to the cathode BAC, the plate currents through the tube will be reduced to a negligible value. When a voltage or signal is applied to either grid BA$f$ or BA$r$, however, current of substantial value will flow in the corresponding plate circuit during the positive half of the grid voltage cycle. During the negative half of the grid voltage cycle the current in the corresponding plate circuit will be reduced to zero. Since the tube BA will be conductive only during the positive half of the grid voltage cycle, the plate current flowing will, therefore, be pulsating having the frequency of the alternating current impressed on the grid. If the same alternating voltage is simultaneously applied to both grid circuits, substantially identical pulsating currents will flow in each plate circuit. When voltage is impressed upon either grid circuit, pulsating plate current will flow through one of the windings MAF or MAR, thereby energizing the motor for rotation in one direction or the other. If the second triode is then made conducting pulsating plate current will flow through the other field winding energizing the motor for rotation in the reverse direction whereupon the motor will be energized for rotation in both directions and become stalled.

As shown the means for selectively energizing the grids BA$f$ and BA$r$ includes arms GF and GR which may be identical to the correspondingly identified arms of Fig. 1 and are adapted to cooperate with pointer G$^1$ and pin F as in the device of Fig. 1. The pointer G$^1$ and pin F are connected together and to a source of alternating potential through grid current limiting resistor R$g$ over conductor $hg$ which is connected at $j$A to one end of winding $t$A$^3$. The arms GF and GR are connected respectively to grids BA$f$ and BA$r$ whereby the grids may be selectively energized by contact of arm GF with pin F or contact of arm GR with pointer G$^1$ respectively. Grid leak resistors CA$f$ and CA$r$ are provided for grids BA$f$ and BA$r$ respectively whereby following removal of the alternating current voltage from the grids, the latter are restored to zero potential with respect to the common cathode BAC.

When in the clockwise movement of levers GF and GR the galvanometer pointer G$^1$ is deflected to a position left of its normal balanced position, lever GR will engage the pointer G$^1$ before lever GF makes engagement with the pin F. Thereupon an alternating potential will be applied to the grid BA$r$ and pulsating direct current will flow in the motor field winding MAR energizing the motor MA for rotation in a predetermined direction. When the lever GF subsequently makes engagement with the pin F an alternating potential will be applied to the grid BA$f$ and the other triode in the tube BA will also become conductive. Thereupon pulsating plate current will flow in the motor field winding MAF and the motor MA will be equally energized for rotation in both directions and become stalled, stopping substantially instantaneously. An interruptor switch FR corresponding to and operated in the same manner as the switch S of Fig. 1 is employed to de-energize the grids during the counterclockwise movement of levers GF and GR. If in the clockwise movement of the levers GF and GR the galvanometer pointer G$^1$ is deflected to the right, the lever GF will contact pin F first and the motor MA will rotate in the opposite direction which rotation will continue until the lever GR engages the galvanometer pointer G$^1$ thereby stalling the motor.

As the motor MA is rotated in one direction or the other the cam KMA is moved through an angle depending upon the duration of such rotation. An adjustment of the position of the armature $r$A is thereby made rebalancing the bridge circuit and restoring the galvanometer pointer to its normal balanced position.

For purposes of controlling the flow in conduit LA I may provide a connection from motor MA, as diagrammatically illustrated, to the valve VA whereby the latter is caused to be opened or closed in response to decrease or increase respectively in the flow or if desired a separate motor may be connected in parallel with motor MA for this purpose.

I have illustrated in Figs. 1-14 the invention as applied to series motors for purposes of simplicity and will now describe by reference to Figs. 15-21 the invention as applied to alternative types of motors. The various switch actuating means herein disclosed may be interchangeably used in Figs. 15-21 for energizing the different motor circuits but for simplification I have illustrated the device of Fig. 1.

In Fig. 15 the motor MB is of the known shading pole variety having a main field MB$^1$ energized directly from the line, squirrel cage armature MB$^2$, shading fields MF$^1$, MF$^2$ and MR$^1$, MR$^2$ and a field core common to all the fields. The field set up in the field core by the main winding and with which armature MB$^2$ is in inductive relation, is controlled by shading poles to provide a rotating field such as to cause rotation of the armature in one direction or the other accordingly as one pair of shading fields MF$^1$, MF$^2$ or the other pair MR$^1$, MR$^2$ is short circuited. The conductor FL, connected to pointer G$^1$ and stud F, is provided with two branch conductors RR and FF. Conductor FF is connected to one end of field winding MF$^2$, the latter is connected to winding MF$^1$, and the opposite end of field winding MF$^1$ is connected by conductor 2 to arm GF so that fields MF$^1$ and MF$^2$ are short circuited by engagement of arm GF and stud F. Fields MR$^1$ and MR$^2$ may be similarly short circuited over a circuit from conductor FL, to conductor RR, field winding MR$^1$ one end of which is connected to field winding MR$^2$, field winding MR$^2$, conductor 3, arm GR, pointer G$^1$ and back to conductor FL. If arms GF and GR simultaneously engage respectively the stud F and pointer G$^1$ both fields will be short circuited and the motor will be subjected to a turning force of equal strength in both directions and thereby be held stationary. Thus in the operation of the arms GF and GR as explained in connection with Fig. 1, the motor MB may be rotated in one direction or the other or may be held stationary or de-energized in accordance with the deflections of pointer G$^1$.

In Fig. 16 the motor MC is another form of the well known induction motor variety having a main field winding MC$^1$ energized directly from the line, shading fields MCF and MCR, a second winding MCS the purpose of which will be more fully described hereinafter, a squirrel cage armature not shown, and a core, also not shown, common to all the windings. The field set up in the field core by the main field winding, and with which the rotor is in inductive relation is controlled by shading poles to provide a rotating field such as to cause rotation of the rotor in one direction or the other. A transformer, the primary of which is the main field winding MC¹, and the secondary of which is the winding MCS having a center tap MCS¹, is provided within the motor itself. The purpose of this transformer is to provide means whereby alternating voltage in phase with or 180° out of phase with the line voltage may be impressed, as desired, on the shading field windings to thereby set up a rotating field in one direction or the other and cause rotation of the rotor in that direction.

The conductor CL, connected to pointer G¹ and stud F, is connected to one end of the shading field windings which are connected in series, and the opposite end of these windings is connected to the center tap MCS¹ on the winding MCS. One end of the winding MCS is connected by conductor 3 to the arm GR so that an alternating current voltage either in phase with or 180° out of phase with the line voltage will be applied to the shading fields when the arm GR engages the pointer G¹. The other end of the winding MCS is connected by conductor 2 to the arm GF so that an alternating current voltage 180° out of phase with that applied in the previous case will be impressed upon the shading fields when the arm GF engages the stud F. If the arms GF and GR simultaneously engage, respectively, the pin F and pointer G¹, alternating current voltages 180° out of phase with each other will be applied to the shading fields whereby the rotor will be equally urged to rotation in both directions, and thereby be held stationary. The impedance of the circuit which is closed when the arms GF and GR are simultaneously in engagement with their respective contacts is desirably made sufficiently high to prevent overloading of the transformer.

In Fig. 17 the motor MD is of the well known capacitor induction variety having field windings MDF and MDR spaced in quadrature with each other, and so disposed relatively to a squirrel cage rotor not shown that half of each winding is at diametrically opposite sides of the rotor, and a condenser MDC. From the well known action of such condenser motors the fields set up in the squirrel cage rotor by the field windings MDF and MDR have a phase displacement of approximately 90° whereby the said fields form together a rotating field such as to cause rotation of the rotor in one direction or the other accordingly as the field MDF is displaced 90° relatively to the field MDR in the forward or the backward direction. The conductor MDL, connected to the line L¹ is provided with two branch conductors MDM and MDN. Conductor MDM is connected to one end of field winding MDF and conductor MDN to one end of field winding MDR, the opposite ends of these windings being connected to opposite terminals of the condenser MDC, and also by means of conductors 3 and 2, to the arms GR and GF, respectively.

When the arm GR engages the pointer G¹ of Fig. 17, two circuits will be closed, one from line L² to conductor MDH, pointer G¹, arm GR, conductor 3, conductor MDK, field winding MDR, conductor MDL to line L¹, and the other from line L² to conductor MDH, pointer G¹, arm GR, conductor 3, condenser MDC, conductor MDI, field winding MDF, conductor MDM, and conductor MDL to line L¹. The fields MDF and MDR are thereby placed in parallel, the condenser MDC being in series with the winding MDF. Because of the action of the condenser the current through the winding MDF will then lead or be displaced in the forward direction from the current through the winding MDR, whereby a rotating field will be set up in a predetermined direction and the squirrel cage rotor will be urged to rotation in that direction.

Similarly when the arm GF engages the stud F the condenser MDC will be in series with the winding MDR and this combination will be in parallel with the winding MDF, whereby the current through the winding MDF will then lag or be displaced in the backward direction from the current through the winding MDR, and a rotating field will be set up in the opposite direction. These circuits may be traced from line L² to conductor MDH, stud F, arm GF, conductor 2, field MDF, conductor MDM, conductor MDL to line L¹, and from conductor 2 to condenser MDC, conductor MDK, field MDR, conductor MDN back to conductor MDL. If arms GF and GR simultaneously engage, respectively, the stud F and pointer G¹, the squirrel cage rotor will be subjected to a torque equally in both directions and thereby be held stationary.

In Fig. 18 the motor ME is of the well known low voltage capacitor induction motor variety, having field windings MEF and MER spaced in quadrature to each other and so disposed relatively to a squirrel cage rotor not shown that half of each winding is at diametrically opposite sides of the rotor. Provision, in the form of a condenser-auto transformer combination MET including a condenser MEC, and an auto transformer winding MEL, is made whereby the alternating currents through the field windings MEF and MER may be displaced in either the forward or the backward direction relatively to each other as desired. In the operation of such motors, when the alternating current and consequently the flux through one field winding is leading that of the other, the magnetic field will shift around the rotor in one direction or the other and urge the rotor to rotation in a corresponding direction.

The conductor MEB connected to the pointer G¹ and the pin F is connected to one terminal of the primary winding of an auto transformer MEA energized from the line. Conductor MED, connected from a tap MEE on the auto transformer, is provided with two branch conductors MEG and MEH. Conductor MEG is connected to one end of field winding MEF and conductor MEH is connected to one end of field winding MER, the opposite end of the latter winding being connected by conductor MEI to a tap MET¹ on the auto transformer secondary winding MEL which is connected in a series-parallel relation to the condenser MEC, and the opposite end of this combination is connected to the other end of field winding MEF. This end of field winding MEF is connected by conductor 3 to the arm GR so that when the arm GR engages the pointer G¹ alternating currents will flow in the windings MEF and MER, the current in the winding MER leading the current in the winding MEF as a result of the action of the condenser MEC. Similarly the field winding MER is connected by conductors MEI and 2 to the arm GF so that when the arm GF engages the pin F alternating currents will flow in the windings MEF and MER, in this case the current in the winding MEF leading the current in the winding MER since the condenser combination MET will now be in series with the winding MEF. If arms GR and GF simultaneously engage respectively the pointer G¹ and the stud F, the condenser arrangement MET will be placed in series with both field windings and the squirrel cage rotor will be subjected to a turning force in both directions and thereby be held stationary.

Figure 19:
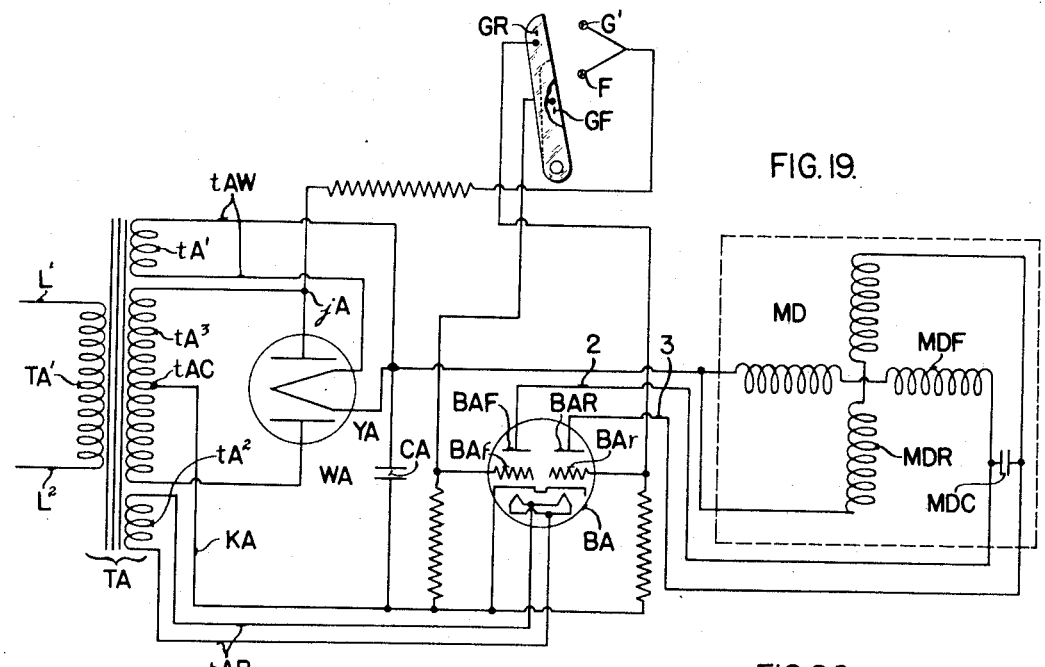

As will be clear various combinations of the different styles of motors with the typical control arrangements shown may be made within the scope of this invention, one example of which is illustrated in Fig. 19.

The motor MD of Fig. 19 is of the capacitor induction motor variety described in Fig. 17 and is shown as controlled through an amplifier circuit which may be identical with that described in Fig. 14. In operation the condenser MDC will be selectively placed in series with either field MDF or MDR accordingly as one or the other triodes is rendered conductive. If the triode including the anode BAR is conductive, the condenser MDC will be in series with field winding MDF, and if the triode including the anode BAF is conductive, the condenser MDC will be in series with field winding MDR. When contact arm GR engages the pointer $G^1$, an alternating potential will be impressed on the grid BAr and pulsating current conducted by the tube will energize the motor through a circuit including the anode BAR whereby the motor will be urged to rotation in one direction or the other. Similarly, when the contact arm GF engages the stud F the grid BAf will be energized and the motor will then be energized for rotation in the opposite direction through a circuit including the anode BAF. If the contact arms GR and GF simultaneously engage respectively the pointer GE and stud F, the grids BAr and BAf will both be energized at the same time and pulsating currents will flow in both plate circuits whereby the motor will be equally energized for rotation in both directions and thereby be held stationary.

Figure 20:
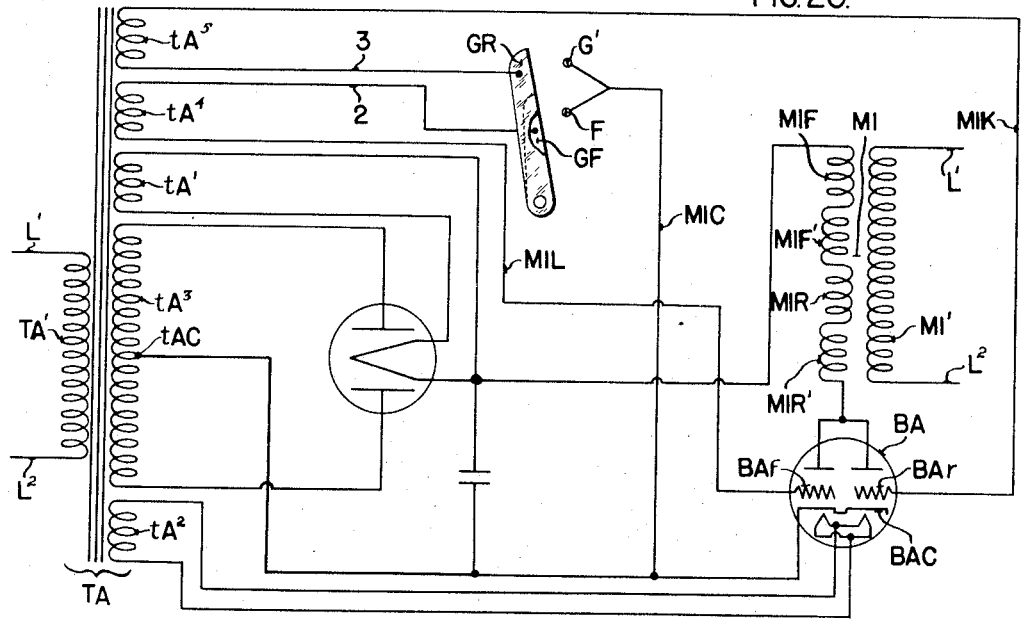

In Fig. 20, the motor MI is of the split phase, shading pole, variety, having a main field winding $MI^1$ energized directly from the line and auxiliary field windings MIF, $MIF^1$, MIR, and $MIR^1$. This motor may be similar in construction to the motor MB described in Fig. 15 but is not selectively controlled for rotation in one direction or the other or stalled by short circuiting diametrically opposite fields MIF and MIR or $MIF^1$ and $MIR^1$. Instead these auxiliary windings are connected in series with the plate to cathode resistances of the triodes of the tube BA, and the motor is controlled for rotation in one direction or the other or stalled by applying to these windings an alternating current in phase with or 180° out of phase with the line voltage.

The main field winding $MI^1$ is energized directly from the line, but is of such high inductance that the current through this winding lags the line voltage by approximately 90°. The tube BA, acting as a resistance, tends to keep the current in the auxiliary windings approximately in phase with the line voltage so that in effect the motor MI is operated as a split phase motor for rotation in one direction or the other as the current through the auxiliary windings is selectively controlled. If desired a condenser of suitable capacity may be connected across the terminals of the auxiliary windings for holding the current through these windings more closely to the desired phase angle, and for transforming the pulsating current produced by the tube BA into current of more nearly sinusoidal form.

As shown the means for reversing the phase of the alternating current voltage applied to the auxiliary fields includes a twin amplifier tube BA such as a "53" type tube described hereinbefore.

The necessary direct current voltages for this tube are obtained from a standard rectifier arrangement such as described in connection with Fig. 14. Means are provided for impressing upon the grids BAf and BAr alternating current potentials which means include transformer windings $tA^4$ and $tA^5$. These windings may be wound on the power transformer core TA.

The pointer $G^1$ and stud F are connected by conductor MIC to the cathode BAC. The grid BAf is connected by conductor MIL to one end of the winding $tA^4$, the other end of this winding being connected by conductor 2 to the arm GF so that an alternating current potential will be applied to the grid BAf when the arm GF engages the stud F. Thereupon the corresponding triode of the tube BA will become conductive and pulsating direct current will flow through the auxiliary field windings of motor MI thereby energizing the motor for rotation in one direction or the other. An alternating potential may be similarly applied to the grid BAr over a circuit from grid BAr, conductor MIK, field winding $tA^5$, conductor 3, arm GR, pointer $G^1$ and conductor MIC to the cathode BAC. As shown in Fig. 20, however, connection is so made to the winding $tA^5$ that the alternating potential applied to the grid BAr will be 180° out of phase with that applied to the grid BAf whereby a pulsating direct current displaced 180° in phase relation will flow through the motor auxiliary field windings when the arm GF engages the stud F and the motor will thereby rotate in the opposite direction. If arms GF and GR simultaneously engage respectively the stud F and pointer $G^1$, the motor will be urged to rotation in both directions and be held stationary.

Figure 21:
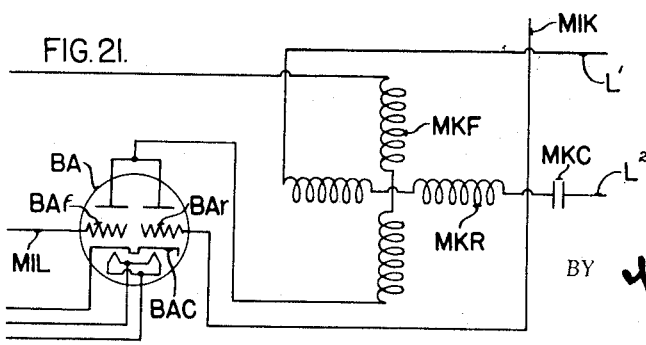

In Fig. 21 the motor MK is another of the capacitor induction motor variety having field windings MKF and MKR spaced in quadrature with each other and so disposed relatively to a squirrel cage rotor not shown that half of each winding is at diametrically opposite sides of the rotor. Provision is made, in the form of an amplifier similar to that described in connection with Fig. 20, whereby pulsating direct current in phase with or 180° out of phase with the line voltage may be selectively applied to the winding MKF. The field winding MKR has a condenser MKC in series with it and is energized directly from the line. As a result of the action of condenser MKC the current flowing in the winding MKR will lead the line voltage by approximately 90°. Since the pulsating current flowing in the output of the amplifier will be in phase with or 180° out of phase with the line voltage, the fields set up by the windings MKF and MKR will have a phase displacement of approximately 90°, and therefore the two fields will form together a rotating field in one direction or the other and urge the rotor to rotation in a corresponding direction.

The means for controlling the energization of the motor of Fig. 21 for rotation in one direction or the other may be identical with the control means of Fig. 20. When the arm GF engages the stud F, grid BAf is energized whereupon pulsating direct current in phase with or 180° out of phase with the line voltage flows through the winding MKF thereby urging the motor to rotation in one direction or the other. Similarly when the arm GR engages the pointer $G^1$ the grid BAr will be energized whereby pulsating current displaced 180° will flow in the winding MKF and the motor will be energized for rotation in the opposite direction. If the arms GF and GR simultaneously engage the stud F and pointer G¹ the motor will be urged to rotation in both directions and thereby be held stationary.

As will be apparent to those skilled in the art, the provisions illustrated and described for producing opposed control effects varying in relative magnitude with the position of a galvanometer pointer or other element deflecting in accordance with variations in a variable condition, possess important practical advantages for control instrument use, because of their reliability and definite action, and because they contribute to instrument simplification and particularly, because of their availability for use in controlling a stalling motor or analogous relay device. It will be readily apparent to those skilled in the art also that the apparatus forms and circuit arrangements shown in the drawings are illustrative of some, only, of the forms in which the invention may be embodied, and of its range or field of use.

Subject matter disclosed in this application and not claimed is being claimed in my copending application, Serial No. 275,505, filed May 24, 1939.

While in accordance with the provisions of the statutes I have illustrated and described preferred embodiments of the present invention, those skilled in the art will understand that changes may be made in the form of the apparatus disclosed without departing from the spirit of my invention as set forth in the appended claims, and that some features of the present invention may sometimes be used with advantage, without a corresponding use of other features.

Having now described my invention, what I claim as new and desire to secure by Letters Patent is:

1. The method of control which consists in energizing a control element to produce a control effect of fixed magnitude in one direction, during a substantial portion of predetermined and periodically repeated intervals, energizing a second control element to produce an opposing effect of fixed magnitude during intervals respectively coinciding with, overlapping or included within said portion of the first mentioned intervals, accordingly as the value of a variable controlling condition is equal to, exceeds, or is less than a predetermined value when the different last mentioned effects are produced, and deenergizing both of said elements during the remaining portion of said intervals.

2. In cyclic control, in response to a variable condition, of an element actuated by a reversible motor, the method which comprises energizing said motor for movement in one direction at a point in a predetermined portion of each operating cycle dependent upon the direction and extent of deviation of the value of said condition from a predetermined normal value thereof, energizing said motor for movement in the opposite direction at a point of said predetermined portion of each such cycle which is predetermined and independent of the value of said condition, and deenergizing said motor during the remaining portion of each operating cycle, said predetermined portion of each operating cycle being of sufficient time duration for said motor to start when energized for movement in only one direction and to stall when energized simultaneously for movement in both directions.

3. In cyclic control apparatus, the combination with means responsive to variations in a variable control condition, of means cooperating with the first mentioned means to produce successive control effects of fixed magnitude in one direction one during a predetermined portion of each of regularly repeated intervals and each varying in duration with the value of said condition, and means for producing successive control effects of fixed magnitude, one during said predetermined portion of each of said intervals which are opposite in direction to the first mentioned effects and of determined duration independent of the magnitude of said condition, means for rendering ineffective said second and third mentioned means during the remaining portion of each of said intervals, and means for producing a control action at each interval at which the duration of the two effects produced are unequal.

4. In cyclic control apparatus, the combination with means responsive to variations in a variable control condition, of physically actuable means cooperating with the first mentioned means to produce a control effect in one direction varying in magnitude with the value of said condition, once during each of regularly repeated intervals, and physically actuable means for producing a control effect once during each interval which is opposite in direction to the first mentioned effects and is of a fixed magnitude equal to the magnitude of each first mentioned effect produced when the value of said condition has a predetermined normal magnitude, and means cooperating with both of said effect producing means, to produce a control action at each interval at which the two effects produced are unequal.

5. In control apparatus, the combination with means responsive to variations in a variable control condition, of a motor including two energizing windings and adapted to operate in one direction or the other accordingly as one or the other of said windings is separately energized, and to stall when both windings are simultaneously energized, first physically actuable means cooperating with the first mentioned means to energize one of said windings during successive periods, each varying in duration with the value of said condition at the time, second physically actuable means for energizing the other of said windings during periods corresponding in frequency with the first mentioned periods and the duration of each of which is constant, and a single device to actuate said first and second mentioned physically actuable means.

6. In control apparatus, the combination with means responsive to variations in a variable control condition, of a motor including two energizing windings and adapted to operate in one direction or the other accordingly as one or the other of said windings is separately energized and to stall when both windings are simultaneously energized, means cooperating with the first mentioned means for energizing one of said windings during a substantial portion of successive intervals, each portion being of a duration corresponding to the value of said condition at the time, means for energizing the other of said windings during a fixed portion of successive intervals corresponding in frequency to the first mentioned intervals and the duration of said fixed portion of which corresponds to the magnitude of each first mentioned interval portion occurring at a time at which said condition has a predetermined normal value, and means for deenergizing both of said windings during the remaining portion of said intervals, said interval portions being of sufficient time duration for said motor to start when only one of said energizing windings is energized and to stall when both windings are simultaneously energized.

7. In control apparatus, the combination with an element deflecting in accordance with the variations in a variable condition, of a member movable to and fro between an initial position and a fixed second position, means cooperating with said member for producing a control effect in one direction and of fixed magnitude on each such to and fro movement of the member, a second member movable between an initial position and a second position thereof determined by and varying with the deflective position of said element, means cooperating with said second member to produce, on each to and fro movement of said second member, a control effect opposite in direction to the first mentioned control effect and varying in magnitude in accordance with the displacement of the second position of said second member from a position thereof corresponding to a predetermined normal value of said condition, and means for giving said members to and fro movements of the same frequency.

8. In control apparatus, the combination with means responsive to variations in a variable control condition, of a motor having two windings each adapted when energized to produce a control effect opposite in direction and equal in magnitude to the control effect produced by the energization of the other, means independent of the first mentioned means for energizing one of said windings at intervals of one series, means cooperating with the first mentioned means for energizing the second of said windings at intervals of a second series and each of which precedes or follows a corresponding interval of the first series accordingly, as the value of said condition differs in one direction or the other from a normal value of said condition, and means for simultaneously de-energizing both windings at intervals each following a corresponding interval of each series, the intervals of the first and second series being of sufficient time duration for said motor to start when only one of said windings is energized and to stall when both windings are simultaneously energized.

9. In control apparatus, an element deflecting in accordance with variations in a control condition, a stop, a pair of control members one biased for movement from an initial position into a second position in which it engages and is arrested by said stop, and the other biased for a movement from an initial position into a second position in which it is engaged and arrested by said element, means operating periodically to move said members into their initial positions and to control their bias movement back into their second positions, and means cooperating with said members to produce a control action dependent on the relative time periods required for corresponding movements of the two elements between their respective initial and second positions.

10. In control apparatus, an element deflecting in accordance with variations in a control condition, a stop, a pair of control members one biased for movement from an initial position into a second position in which it engages and is arrested by said stop, and the other biased for a movement from an initial position into a second position in which it is engaged and arrested by said element, means operating periodically to move said members into their initial positions and to control their bias movement back into their second positions, and means cooperating with said members to produce a control action dependent on the relation of the distance between the initial and second positions of one of said members to the distance between the initial and second positions of the other member.

11. In control apparatus, an element deflecting in accordance with variations in a control condition, a stop, a first member movable back and forth between an initial position and a second position in which it engages and is arrested by said stop, a second member movable back and forth between an initial position, and a second position in which it engages and is arrested by said element, periodically operating means for so effecting to and fro movements of said members between their respective initial and second position, that the first member moves into and out of its second position at regular intervals and said second member moves into and out of its second position at intervals dependent on the deflection of said element, means cooperating with the first member on each movement of the latter into its said second position to close an energizing circuit, means cooperating with said second member on each movement of the latter into its said second position to close a second energizing circuit, and means actuated by said periodically operating means to simultaneously open both of said circuits following each closure of the latter and prior to the subsequent movement of either member out of its second position.

12. In control apparatus, an element deflecting in accordance with variations in a control condition, a stop, a pair of control members, one biased for movement from an initial position into a second position in which it engages said stop and the other biased for movement from an initial position into a second position in which it engages said element, a pair of mercury switches respectively actuated by said members and each adjusted between open and closed positions by movement of its actuating member between the first and second positions of the latter, a third switch adapted to render the closure of each of the first mentioned switches operative or inoperative accordingly as said third switch is in one position or in a second position, and means operating periodically to move said members into their initial positions and to control their bias movements back into their second positions and to adjust said third switch into its said one position prior to the movement of either of said members into its second position and to adjust said third switch into its second position after each of said members has moved into its second position and prior to the movement of either of said members out of its second position.

13. In control apparatus, the combination with a pair of members, each pivoted to turn about an axis and each biased for turning movement from an initial position into a second position of the member, stationary means engaged by one of said members on each movement of the latter away from its initial position and thereby terminating such movement and determining the second position of that member, an element deflecting in accordance with the variations in a variable quantity engaged by the second of said members on each movement of the latter away from its initial position and thereby terminating such movement and determining the second position of said second member, means acting on said members following each movement to each member into its second position to return said members to their respective initial positions, means cooperating with said one member to create a control effect in one direction and of constant magnitude on each movement of said one member into its second position, and means cooperating with the second member to produce a control effect on each movement of said second member into its second position, which is opposite in direction to the first mentioned effect and varies in magnitude with the position of said element determining the last mentioned second position.

14. In control apparatus, the combination with a pair of members, each pivoted to turn about an axis and each biased for turning movement from an initial position into a second position of the member, stationary means engaged by one of said members on each movement of the latter away from its initial position and thereby terminating such movement and determining the second position of that member, an element deflecting in accordance with the variations in a variable quantity engaged by the second of said members on each movement of the latter away from its initial position, and thereby terminating such movement and determining the second position of said second member, means acting on said members following each movement of each member into its second position to return said members to their respective initial positions, means cooperating with said one member to create a control effect in one direction and of constant magnitude on each movement of said one member into its second position, and means cooperating with said second member, to produce a control effect on each movement of said second member into its second position, which is opposite in direction to the first mentioned effect and is of greater or less magnitude than the first mentioned effect, accordingly as the position of said element determining the last mentioned second position corresponds to a value of said condition which is greater or less than a predetermined normal value of said condition.

15. In control apparatus, the combination with a control meter including a deflecting switch contact part, of a motor including two energizing windings and adapted to operate in one direction or the other accordingly as one or the other of said windings is separately energized and to stall when both windings are simultaneously energized, means for energizing one of said windings at regular intervals and comprising a stationary switch contact and a movable switch member biased for movement into engagement with said stationary contact, means for energizing the other winding at intervals varying with the deflection of said element and comprising a second movable switch member biased for movement into engagement with said switch contact part, and means operating periodically to move the first and second mentioned switch members out of engagement with said stationary contact and contact part, respectively, each into an initial position, and to thereafter permit their bias movements back into engagement with said stationary contact and contact part, respectively, and means operating periodically to de-energize each winding following the said engagement of each of the two switch members prior to the subsequent movement of either member out of said engagement.

16. In control apparatus, the combination with switching means comprising a member pivoted to turn about an axis and biased for movement from an initial position into a second position, a stop engaged by said member on its bias movement from said initial position arresting said movement and thereby determining the second position of said member, means for adjusting said stop toward and away from said initial position in accordance with variations in one direction or another of a variable condition, a second switching means comprising an element pivoted to turn about an axis between switch open and switch closed position and biased for movement into one of said positions, periodically operating mechanism for moving said member and element into their initial positions and controlling their bias return movement into their second positions, and adapted to move said element into its switch open and closed positions, respectively, prior to the movements of said member out of and back into its second position.

17. In control apparatus, the combination with switching means comprising a member pivoted to turn about an axis and biased for movement from an initial position into a second position, a stop engaged by said member on its bias movement from said initial position arresting said movement and thereby determining the second position of said member, means for adjusting said stop toward and away from said initial position in accordance with variations in one direction or another of a variable condition, a second switching means comprising an element pivoted to turn about an axis between switch open and switch closed positions and biased for movement into one of said positions, and periodically operating mechanism for moving said member and element into their respective initial positions and controlling their bias return movement into their respective second positions, and including a floating lever which on each operation of said mechanism acts simultaneously on said member and element with such leverage that said element is moved into its initial and second positions, respectively prior to the movements of said member out of and back into its second position.

18. In a self-balancing potentiometer, the combination with a galvanometer including a deflecting pointer, a re-balancing mechanism including two windings and adapted to effect a re-balancing operation in one direction or the other, accordingly as one or the other of said windings is separately energized and rendered inoperative to effect a re-balancing operation by the simultaneous energization of the two windings, two switches, one controlling the energization of one, and the other the energization of the second of said windings, cyclically operating mechanism including means for adjusting one of said switches into its winding energizing position at a fixed stage of each operating cycle and including means cooperating with said pointer to adjust the other of said switches into its energizing position at a stage in each operating cycle preceding or following said fixed stage of said cycle, accordingly as the deflective position of said pointer is at one side or the other of its neutral position.

19. The combination with measuring apparatus including a deflecting element, of an inductance bridge comprising a transmitter including an armature moved by and in accordance with the deflection of said element and including a receiver comprising an armature adapted when moved into a position corresponding to the position of the first mentioned armature to balance said bridge and including a conductor through which, when said bridge is unbalanced, there is an electric current flow varying in magnitude with the unbalance of said bridge, a galvanometer deflecting in accordance with variations in the magnitude of said current flow, and a device for adjusting said receiver armature to rebalance said bridge when unbalanced by adjustments of the transmitter armature, means controlled by said galvanometer tending to operate said device in one sense during regularly repeated intervals and for a portion of each interval varying in magnitude with the deflection of said galvanometer and means tending to operate said device in the opposite sense for a fixed portion of each of said intervals.

20. The combination with measuring apparatus including a deflecting element, of an inductance bridge comprising a transmitter including an armature moved by and in accordance with the deflection of said element and including a receiver comprising an armature adapted when moved into a position corresponding to the position of the first mentioned armature to balance said bridge and including a conductor through which, when said bridge is unbalanced, there is an electric current flow varying in magnitude with the unbalance of said bridge, a galvanometer deflecting in accordance with variations in the magnitude of said current flow through said conductor, means for giving the receiver armature bridge balancing movements comprising a reversible electrical motor, and means controlled by said galvanometer tending to operate said motor in one direction during regularly repeated intervals and for a portion of each interval varying in magnitude with the deflection of said galvanometer, and means tending to operate said motor in the opposite direction for a fixed portion of each of said intervals.

21. In control apparatus, a contact element deflecting in accordance with variations in a control condition, a stationary contact, a first switch, a member movable back and forth between an initial position and a second position in which it engages said stationary contact, a second member movable back and forth between an initial position and a second position in which it engages said contact element, periodically operating means for so effecting to and fro movements of said members between their respective initial and second positions, that the first member moves into and out of its second position at regular intervals and said second member moves into and out of its second position at intervals dependent on the deflection of said element, and electronic current amplifying means connected to said element, stationary contact, and switch members, and energized to deliver one amplified control current when said first switch member engages said stationary contact and to deliver a second amplified control current when said second switch member engages said contact element.

22. In control apparatus, a contact element deflecting in accordance with variations in a control condition, a stationary contact, a first switch member movable back and forth between an initial position and a second position in which it engages said stationary contact, a second member movable back and forth between an initial position and a second position in which it engages said contact element, periodically operating means for so effecting to and fro movements of said members between their respective initial and second positions, that the first member moves into and out of its second position at regular intervals and said second member moves into and out of its second position at intervals dependent on the deflection of said element, and electronic amplifying means including two bias grids, and adapted to deliver one amplified control current when one grid is energized, and to deliver a second amplified control current when the second grid is energized and circuit connections through which one grid is energized when said first switch member engages said stationary contact and through which the other grid is energized when second switch member engages said contact element.

23. In control apparatus, a contact element deflecting in accordance with variations in a control condition, a stationary contact, a first switch member movable back and forth between an initial position and a second position in which it engages by said stationary contact, a second member movable back and forth between an initial position and a second position in which it engages said contact element, periodically operating means for so effecting to and fro movements of said members between their respective initial and second positions, that the first member moves into and out of its second position at regular intervals and said second member moves into and out of its second position at intervals dependent on the deflection of said element, and electronic current amplifying means connected to said element, stationary contact and switch members and including two bias grids, and adapted to deliver amplified pulsating current impulses during successive separated intervals when one grid only is energized, and when the other grid is energized to deliver amplified current impulses during successive intervals alternating with the first, and circuit connection through which one grid is energized when said first switch member engages said stationary contact and through which the other grid is energized when second switch member engages said contact element.

24. The combination with two members pivoted to turn about a common axis, each from an initial position into a second position, a stop located at a fixed position relative to said initial position and engaged by one of said members as it moves into its second position, an element deflecting in accordance with variations in a variable condition into position at different distances from the initial position of the other member and engaged by the latter as it moves into its second position, cyclic operating means for moving said members between their initial and second positions, and means selectively responsive to the difference in the respective distances between the initial and fixed positions of the two members.

25. The combination with an element deflecting in accordance with variations in a variable condition, of a member movable back and forth between an initial position and a second position at a fixed distance from said initial position, a second member movable back and forth between an initial position and a second position at a distance from the last mentioned initial position which is dependent upon and varies with the deflective position of said element, cyclic operating means for effecting to and fro movements of the same frequency of the two members between their respective initial and second positions with proportional velocities of movements of the two members whereby the time required for each movement of the second member will vary relative to the time required for the corresponding movement of the first mentioned member when the distances between the respective initial and second positions of the two members are different, and means for producing opposing control effects dependent for their relative magnitudes upon the times respectively required for corresponding movements of the two members between their respective initial and second positions.

26. In control apparatus, the combination with means responsive to variations in a variable control condition, of a motor including two energizing windings and adapted to operate in one direction or the other accordingly as one or the other of said windings is separately energized, and to stall when both windings are simultaneously energized, first physically actuable means cooperating with the first mentioned means to energize one of said windings during successive periods, each varying in duration with the value of said condition at the time, second physically actuable means for energizing the other of said windings during periods corresponding in frequency with the first mentioned periods and the duration of each of which is constant, and motor means to actuate said first and second mentioned physically actuable means.

THOMAS R. HARRISON.